United States Patent
Chai (10) Patent No.: US 10,320,991 B2
(45) Date of Patent: Jun. 11, 2019

(54) POLICY AND CHARGING ENFORCEMENT FUNCTION APPARATUS, ONLINE CHARGING APPARATUS, AND ONLINE CHARGING METHOD

(71) Applicant: Huawei Technologies Co., Ltd., Shenzhen (CN)

(72) Inventor: Xiaoqian Chai, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/809,645

(22) Filed: Nov. 10, 2017

(65) Prior Publication Data
US 2018/0077293 A1    Mar. 15, 2018

Related U.S. Application Data

(63) Continuation of application No. PCT/CN2016/077435, filed on Mar. 26, 2016.

(30) Foreign Application Priority Data

May 11, 2015    (CN) .......................... 2015 1 0236591

(51) Int. Cl.
*H04W 4/24*    (2018.01)
*H04L 12/14*    (2006.01)
(Continued)

(52) U.S. Cl.
CPC ........ *H04M 15/66* (2013.01); *H04L 12/1407* (2013.01); *H04M 15/09* (2013.01);
(Continued)

(58) Field of Classification Search
CPC ........ H04W 4/24; H04W 12/12; H04M 15/66
See application file for complete search history.

(56) References Cited

U.S. PATENT DOCUMENTS

2011/0263238 A1    10/2011    Riley et al.
2014/0040975 A1*   2/2014     Raleigh ................. H04W 12/12
                                                                    726/1
(Continued)

FOREIGN PATENT DOCUMENTS

CN    101212532 A    7/2008
CN    102547640 A    7/2012
(Continued)

OTHER PUBLICATIONS

Machine Translation and Abstract of Chinese Publication No. CN103079236, May 1, 2013, 34 pages.
(Continued)

*Primary Examiner* — Diane D Mizrahi
(74) *Attorney, Agent, or Firm* — Conley Rose, P.C.

(57) ABSTRACT

A policy and charging enforcement function (PCEF) apparatus, an online charging apparatus, and an online charging method, where the online charging method includes receiving a policy and charging control (PCC) rule from a policy and charging rules function (PCRF), determining that a service data flow of a user equipment is a sponsor service data flow sponsored by a sponsor, determining, based on a rating group of the sponsor service data flow included in the PCC rule, whether the PCEF apparatus has a credit quota available to the sponsor service data flow when the sponsor service data flow uses online charging, and sending a credit control request including the rating group to the online charging apparatus when the PCEF apparatus does not have the credit quota available to the sponsor service data flow.

18 Claims, 6 Drawing Sheets

(51) Int. Cl.
*H04M 15/00* (2006.01)
*H04M 17/00* (2006.01)

(52) U.S. Cl.
CPC ......... *H04M 15/64* (2013.01); *H04M 15/785* (2013.01); *H04M 15/8083* (2013.01); *H04M 15/8214* (2013.01); *H04M 15/854* (2013.01); *H04M 17/20* (2013.01); *H04W 4/24* (2013.01); *H04M 15/8016* (2013.01); *H04M 2215/0192* (2013.01)

(56) References Cited

U.S. PATENT DOCUMENTS

| | | | |
|---|---|---|---|
| 2015/0011182 A1 | 1/2015 | Goldner et al. | |
| 2015/0105045 A1 | 4/2015 | Rolfe et al. | |
| 2015/0156334 A1* | 6/2015 | Chai .................. | H04L 12/1467 455/406 |

FOREIGN PATENT DOCUMENTS

| | | |
|---|---|---|
| CN | 103079236 A | 5/2013 |
| CN | 103888928 A | 6/2014 |
| WO | 2014207518 A1 | 12/2014 |

OTHER PUBLICATIONS

Machine Translation and Abstract of Chinese Publication No. CN103888928, Jun. 25, 2014, 37 pages.

"3rd Generation Partnership Project; Technical Specification Group Core Network and Terminals; Policy and Charging Control (PCC); Reference points (Release 13)," 3GPP TS 29.212 V13.0.0, Dec. 2014, 231 pages.

"3rd Generation Partnership Project; Technical Specification Group Services and System Aspects; Telecommunication management; Charging management; Packet Switched (PS) domain charging (Release 12)," 3GPP TS 32.251 V12.8.0, Dec. 2014, 158 pages.

"3rd Generation Partnership Project; Technical Specification Group Services and System Aspects; Telecommunication management; Charging management; Packet Switched (PS) domain charging (Release 13)," 3GPP TS 32.251 V13.0.0, Mar. 2015, 159 pages.

Foreign Communication From a Counterpart Application, PCT Application No. PCT/CN2016/077435, English Translation of International Search Report dated Jun. 29, 2016, 2 pages.

Foreign Communication From a Counterpart Application, PCT Application No. PCT/CN2016/077435, English Translation of Written Opinion dated Jun. 29, 2016, 6 pages.

Machine Translation and Abstract of Chinese Publication No. CN10121532, Jul. 2, 2008, 58 pages.

Alcatel-Lucent, et al.,"Introduction of Presence Reporting Areas for Charging," XP050869193, S5-144341, Aug. 18-22, 2014, 60 pages.

Qualcomm Incorporated, et al., "Support for sponsored data connectivity: Impacts to current stage 2," XP050630753, S2-102096, May 10-14, 2010, 12 pages.

Foreign Communication From a Counterpart Application, European Application No. 16791946.3, Extended European Search Report dated Apr. 5, 2018, 15 pages.

Machine Translation and Abstract of Chinese Publication No. CN102547640, Jul. 4, 2012, 31 pages.

Foreign Communication From a Counterpart Application, Chinese Application No. 201510236591.7, Chinese Search Report dated Nov. 27, 2018, 2 pages.

Foreign Communication From a Counterpart Application, Chinese Application No. 201510236591.7, Chinese Office Action dated Dec. 5, 2018, 6 pages.

* cited by examiner

POLICY AND CHARGING ENFORCEMENT FUNCTION APPARATUS, ONLINE CHARGING APPARATUS, AND ONLINE CHARGING METHOD

CROSS-REFERENCE TO RELATED APPLICATIONS

This application is a continuation of International Patent Application No. PCT/CN2016/077435 filed on Mar. 26, 2016, which claims priority to Chinese Patent Application No. 201510236591.7 filed on May 11, 2015. The disclosures of the aforementioned applications are hereby incorporated by reference in their entireties.

TECHNICAL FIELD

The present disclosure relates to the field of communications technologies, and in particular, to a policy and charging enforcement function (PCEF) apparatus, an online charging apparatus, and an online charging method.

BACKGROUND

A large-scale deployment of the third Generation (3G) Mobile Communication greatly promotes use of data services. Accurate charging of a data service is a basis of data service development. Policy and charging control (PCC) is a PCC mechanism that is defined by the 3G Partnership Project (3GPP). A core of the PCC mechanism includes when a data flow bearer is established, a gateway device requests, from a Policy and Charging Rules Function (PCRF), a PCC rule of a service data flow. If an application function (AF) provides service layer information of a service to the PCRF, the PCRF generates the PCC rule according to subscriber information stored in a subscription profile repository (SPR), bearer layer information provided by a gateway, and some local policies and service layer information that are configured by an operator in the PCRF, and delivers a command to a PCEF in the gateway to install the PCC rule that is generated. The PCEF performs resource allocation, data flow control, and charging control according to the PCC rule. The PCC mechanism may perform precise control on the service data flow according to an operator policy to implement refined bandwidth operation.

In the foregoing PCC mechanism, the AF is a service network element, and provides related information of a service accessed by a user. For example, the AF can provide information such as a service identity, a service priority indicator, and a service urgency indicator to the PCRF.

In the PCC mechanism, the PCRF is a policy decision entity, and is responsible for controlling quality of service (QoS), a bandwidth, gating, and a charging control policy when user equipment in a home network uses a service, and generating a dynamic policy or specifying a static policy, where the dynamic policy or the static policy is executed by the PCEF.

The PCEF is a policy execution entity, used to execute the dynamic control policy delivered by the PCRF or the static control policy specified by the PCRF. The PCEF may be located in a gateway device, for example, a Gateway General Packet Radio Service (GPRS) Support Node (GGSN), a Packet Data Network (PDN) Gateway (P-GW), or a Wireless Application Protocol (WAP) gateway.

The SPR is a subscription data storage entity, and stores subscription data of a user and maps the subscription data onto an existing system, which may be an online charging system (OCS).

U.S. Patent Application Publication US2015/0156334 A1 discloses a charging control method, a charging trigger apparatus, and an online charging system. The method includes generating, by a charging triggering function (CTF), a resource quota request according to a trigger condition, and sending the resource quota request to an online charging system (OCS), so that the OCS determines a quota type and number after receiving the resource quota request, and allocates a quota for the resource quota request according to the quota type and number determined by the OCS, where the quota and number are determined by the OCS according to the resource quota request.

However, in other approaches, charging of a sponsor is limited only to an offline charging mode. Consequently, a particular service data flow sponsored by the sponsor cannot be online processed, and traffic/duration sponsored by the sponsor cannot be used by an online credit control user in an online credit control process. Therefore, credit control on the user cannot be implemented when the user and the sponsor share costs.

SUMMARY

An objective of the present disclosure is to provide a charging system that can enable charging of a sponsor to be implemented in an online charging mode.

To achieve the foregoing objective, a first embodiment of the present disclosure provides a PCEF apparatus, including a communicator configured to receive a PCC rule from a PCC function apparatus, and a processor configured to determine, based on the PCC rule, that a service data flow of user equipment is a sponsor service data flow sponsored by a sponsor, and configured to determine, based on a rating group that is of the sponsor service data flow and that is included in the PCC rule, whether the PCEF apparatus has a credit quota available to the sponsor service data flow when the sponsor service data flow uses online charging, where when the PCEF apparatus does not have the credit quota available to the sponsor service data flow, the communicator sends a credit control request including the rating group to an online charging apparatus such that the online charging apparatus allocates, based on the rating group, the credit quota available to the sponsor service data flow to the PCEF apparatus. The communicator is further configured to receive the credit quota that is from the online charging apparatus and that is available to the sponsor service data flow, and the processor is further configured to record use information of use of the credit quota by the sponsor service data flow.

With reference to the first embodiment, in a first possible implementation manner, the processor determines, based on the rating group, that the service data flow of the user equipment is the sponsor service data flow sponsored by the sponsor.

With reference to the first embodiment, in a second possible implementation manner, the PCC rule further includes a sponsor identity, and the processor determines, based on the sponsor identity, that the service data flow of the user equipment is the sponsor service data flow sponsored by the sponsor.

With reference to the first embodiment and the first implementation manner, in a third possible implementation manner, the use information recorded by the processor corresponds to the rating group, and when a reporting condition is satisfied, the communicator is further configured to send a reporting message including the rating group and the use information to the online charging apparatus such that the online charging apparatus performs, based on the rating group, charging process on the use information of the sponsor service data flow.

With reference to the first embodiment and the second implementation manner, in a fourth possible implementation manner, the PCC rule further includes the sponsor identity and an application service provider identity, the use information recorded by the processor corresponds to the sponsor identity and the application service provider identity, and when a reporting condition is satisfied, the communicator is further configured to send a reporting message including the sponsor identity, the application service provider identity, and the use information to the online charging apparatus such that the online charging apparatus performs, based on the reporting message, charging process on the use information of the sponsor service data flow.

With reference to the first embodiment and the third implementation manner or the fourth implementation manner, in a fifth possible implementation manner, the communicator is further configured to receive the reporting condition from the online charging apparatus, where the reporting condition is that QoS of the service data flow is changed, and when the QoS of the service data flow is changed, the communicator is further configured to send the reporting message to the online charging apparatus such that the online charging apparatus determines, based on the reporting message, whether the change of the QoS is initiated by the sponsor, and performs corresponding charging process.

With reference to the first embodiment and the fifth implementation manner, in a sixth possible implementation manner, the reporting message includes indication information used to indicate that an initiator of the change of the QoS is the sponsor.

With reference to the first embodiment and the fourth implementation manner, in a seventh possible implementation manner, a reporting level specified by the PCC rule is a sponsor level, the communicator is further configured to receive an update message of the PCC rule from the PCC function apparatus, and the processor changes the reporting level of the PCC rule to a non-sponsor level based on the update message, and when the processor further determines that reporting levels of all effective PCC rules in the PCEF apparatus are currently non-sponsor levels, the communicator further sends the reporting message to the online charging apparatus such that the online charging apparatus ends, based on the reporting message, charging process on the sponsor service data flow.

With reference to the first embodiment and the third implementation manner or the fourth implementation manner, in an eighth possible implementation manner, the PCC rule includes a quota type, and when the PCEF apparatus does not have the credit quota available to the sponsor service data flow, the communicator further sends, to the online charging apparatus, a credit control request that includes the quota type and that specifies the sponsor such that the online charging apparatus determines an allocation manner of the credit quota based on the specified sponsor, and allocates a line of credit corresponding to the quota type to the PCEF apparatus.

With reference to the first embodiment, in a ninth possible implementation manner, the credit quota available to the sponsor service data flow includes duration, and the processor is further configured to record a start time, an end time, and effective use duration of using the credit quota by the sponsor service data flow in a current reporting period.

A second embodiment of the present disclosure provides an online charging apparatus, including a communicator configured to receive a credit control request from a PCEF apparatus, and a processor configured to determine, based on the credit control request, that a service data flow of user equipment is a sponsor service data flow sponsored by a sponsor, and when the sponsor service data flow is data access sponsored by the sponsor, the processor is further configured to allocate a credit quota to the sponsor service data flow according to a service unit type sponsored by the sponsor, and the communicator is further configured to send the credit quota to the PCEF apparatus.

With reference to the second embodiment, in a first possible implementation manner, when the sponsor service data flow is data access sponsored by the sponsor, the processor is further configured to allocate the credit quota to the sponsor service data flow according to a default quota type stored in the online charging apparatus.

With reference to the second embodiment, in a second possible implementation manner, when the sponsor service data flow is data access sponsored by the sponsor, the processor is further configured to allocate, according to the service unit type that is stored in the online charging apparatus and that corresponds to the sponsor, the credit quota corresponding to the service unit type to the sponsor service data flow.

With reference to the second embodiment, in a third possible implementation manner, the credit control request includes a quota type, and when the sponsor service data flow is data access sponsored by the sponsor, the processor further allocates, according to the quota type included in the credit control request, the credit quota corresponding to the quota type to the sponsor service data flow, where the quota type corresponds to the service unit type of the sponsor.

With reference to the second embodiment, in a fourth possible implementation manner, when the sponsor service data flow of the user equipment is data access sponsored by the sponsor, the processor further determines a reporting condition corresponding to the sponsor, and sends the reporting condition to the PCEF apparatus.

With reference to the second embodiment, in a fifth possible implementation manner, the credit control request further includes a sponsor identity, and the processor is further configured to determine, based on the sponsor identity, that the sponsor service data flow is data access sponsored by the sponsor.

With reference to the second embodiment, in a sixth possible implementation manner, the credit control request includes a rating group, and the processor is further configured to determine whether the rating group specifies the sponsor, and when the rating group specifies the sponsor, the processor is further configured to determine that the sponsor service data flow is data access sponsored by the sponsor.

With reference to the second embodiment and the fifth implementation manner or the sixth implementation manner, in a seventh possible implementation manner, the communicator is further configured to receive a reporting message from the PCEF apparatus, where the reporting message includes use information of use of the credit quota by the sponsor service data flow, and the processor is further configured to generate sponsor service data flow information according to the use information, and write the sponsor service data flow information into a call detail record.

With reference to the second embodiment and the seventh implementation manner, in an eighth possible implementation manner, the sponsor service data flow information includes a start time and an end time of the sponsor service data flow, where the start time of the sponsor service data flow is a time at which the communicator sends the credit quota, and the end time of the sponsor service data flow is a time at which the communicator receives the reporting message.

With reference to the second embodiment and the eighth implementation manner, in a ninth possible implementation manner, when the use information includes effective use duration for which the sponsor service data flow uses the credit quota, the sponsor service data flow information further includes the effective use duration.

With reference to the second embodiment and the seventh implementation manner, in a tenth possible implementation manner, when the use information includes a start time, an end time, and effective use duration of using the credit quota by the sponsor service data flow, the sponsor service data flow information includes the start time, the end time, and the effective use duration.

With reference to the second embodiment and the seventh implementation manner, in an eleventh possible implementation manner, when the use information includes the sponsor identity, the sponsor service data flow information further includes the sponsor identity.

With reference to the second embodiment and the seventh implementation manner, in a twelfth possible implementation manner, the processor is further configured to determine, according to an event that is included in the reporting message and that indicates that QoS of the sponsor service data flow is changed and changed QoS, whether the change of the QoS of the sponsor service data flow is initiated by the sponsor, and write the event and the changed QoS into the call detail record when the change of the QoS of the sponsor service data flow is initiated by the sponsor.

With reference to the second embodiment and the twelfth implementation manner, in a thirteenth possible implementation manner, the reporting message includes indication information used to indicate that the change of the QoS of the service data flow is initiated by the sponsor, and the processor determines, according to the indication information, that the change of the QoS of the service data flow is initiated by the sponsor.

A third embodiment of the present disclosure provides a charging method applied to a PCEF apparatus, including receiving a PCC rule from a PCC function apparatus, determining, based on the PCC rule, that a service data flow of user equipment is a sponsor service data flow sponsored by a sponsor, determining, based on a rating group that is of the sponsor service data flow and that is included in the PCC rule, whether the PCEF apparatus has a credit quota available to the sponsor service data flow when the sponsor service data flow uses online charging, sending a credit control request including the rating group to an online charging apparatus when the PCEF apparatus does not have the credit quota available to the sponsor service data flow such that the online charging apparatus allocates, based on the rating group, the credit quota available to the sponsor service data flow to the PCEF apparatus, receiving the credit quota that is from the online charging apparatus and that is available to the sponsor service data flow, and recording use information of use of the credit quota by the sponsor service data flow.

With reference to the third embodiment, in a first possible implementation manner, it is determined based on the rating group that the service data flow of the user equipment is the sponsor service data flow sponsored by the sponsor.

With reference to the third embodiment, in a second possible implementation manner, the PCC rule further includes a sponsor identity, and it is determined based on the sponsor identity that the service data flow of the user equipment is the sponsor service data flow sponsored by the sponsor.

With reference to the third embodiment and the first implementation manner, in a third possible implementation manner, the use information corresponds to the rating group, and when a reporting condition is satisfied, a reporting message including the rating group and the use information is sent to the online charging apparatus such that the online charging apparatus performs, based on the rating group, charging process on the use information of the sponsor service data flow.

With reference to the third embodiment and the second implementation manner, in a fourth possible implementation manner, the PCC rule further includes the sponsor identity and an application service provider identity, the use information corresponds to the sponsor identity and the application service provider identity, and when a reporting condition is satisfied, a reporting message including the sponsor identity, the application service provider identity, and the use information is sent to the online charging apparatus such that the online charging apparatus performs, based on the reporting message, charging process on the use information of the sponsor service data flow.

With reference to the third embodiment and the third implementation manner or the fourth implementation manner, in a fifth possible implementation manner, the reporting condition from the online charging apparatus is received, where the reporting condition is that QoS of the service data flow is changed, and when the QoS of the service data flow is changed, the reporting message is sent to the online charging apparatus such that the online charging apparatus determines, based on the reporting message, whether the change of the QoS is initiated by the sponsor, and performs corresponding charging process.

With reference to the third embodiment and the fifth implementation manner, in a sixth possible implementation manner, the reporting message includes indication information used to indicate that an initiator of the change of the QoS is the sponsor.

With reference to the third embodiment and the fourth implementation manner, in a seventh possible implementation manner, a reporting level specified by the PCC rule is a sponsor level, and an update message of the PCC rule from the PCC function apparatus is received, the reporting level of the PCC rule is changed to a non-sponsor level based on the update message, and when reporting levels of all effective PCC rules in the PCEF apparatus are currently non-sponsor levels, the reporting message is sent to the online charging apparatus such that the online charging apparatus ends, based on the reporting message, charging process on the sponsor service data flow.

With reference to the third embodiment and the third implementation manner or the fourth implementation manner, in an eighth possible implementation manner, the PCC rule includes a quota type, and when the PCEF apparatus does not have the credit quota available to the sponsor service data flow, a credit control request that includes the quota type and that specifies the sponsor is sent to the online charging apparatus such that the online charging apparatus determines an allocation manner of the credit quota based on the specified sponsor, and allocates a line of credit corresponding to the quota type to the PCEF apparatus.

With reference to the third embodiment, in a ninth possible implementation manner, the credit quota available to the sponsor service data flow includes duration, and a start time, an end time, and effective use duration of using the credit quota by the sponsor service data flow in a current reporting period are recorded.

A fourth embodiment of the present disclosure provides a charging method applied to an online charging apparatus, including receiving a credit control request from a PCEF apparatus, determining, based on the credit control request, that a service data flow of user equipment is a sponsor service data flow sponsored by a sponsor, allocating a credit quota to the sponsor service data flow according to a service unit type sponsored by the sponsor when the sponsor service data flow is data access sponsored by the sponsor, and sending the credit quota to the PCEF apparatus.

With reference to the fourth embodiment, in a first possible implementation manner, allocating a credit quota to the sponsor service data flow according to a service unit type sponsored by the sponsor includes allocating the credit quota to the sponsor service data flow according to a default quota type stored in the online charging apparatus when the sponsor service data flow is data access sponsored by the sponsor.

With reference to the fourth embodiment, in a second possible implementation manner, allocating a credit quota to the sponsor service data flow according to a service unit type sponsored by the sponsor includes allocating, according to the service unit type that is stored in the online charging apparatus and that corresponds to the sponsor, the credit quota corresponding to the service unit type to the sponsor service data flow when the sponsor service data flow is data access sponsored by the sponsor.

With reference to the fourth embodiment, in a third possible implementation manner, the credit control request includes a quota type, allocating a credit quota to the sponsor service data flow according to a service unit type sponsored by the sponsor includes allocating, according to the quota type included in the credit control request, the credit quota corresponding to the quota type to the sponsor service data flow when the sponsor service data flow is data access sponsored by the sponsor, where the quota type corresponds to the service unit type of the sponsor.

With reference to the fourth embodiment, in a fourth possible implementation manner, when the sponsor service data flow of the user equipment is data access sponsored by the sponsor, a reporting condition corresponding to the sponsor is further determined, and the reporting condition is sent to the PCEF apparatus.

With reference to the fourth embodiment, in a fifth possible implementation manner, the credit control request further includes a sponsor identity, and it is determined based on the sponsor identity that the sponsor service data flow is data access sponsored by the sponsor.

With reference to the fourth embodiment, in a sixth possible implementation manner, the credit control request includes a rating group, and whether the rating group specifies the sponsor is determined, and when the rating group specifies the sponsor, it is determined that the sponsor service data flow is data access sponsored by the sponsor.

With reference to the fourth embodiment and the fifth implementation manner or the sixth implementation manner, in a seventh possible implementation manner, a reporting message from the PCEF apparatus is received, where the reporting message includes use information of use of the credit quota by the sponsor service data flow, and sponsor service data flow information is generated according to the use information, and the sponsor service data flow information is written into a call detail record.

With reference to the fourth embodiment and the seventh implementation manner, in an eighth possible implementation manner, the sponsor service data flow information includes a start time and an end time of the sponsor service data flow, where the start time of the sponsor service data flow is a time at which the communicator sends the credit quota, and the end time of the sponsor service data flow is a time at which the communicator receives the reporting message.

With reference to the fourth embodiment and the eighth implementation manner, in a ninth possible implementation manner, when the use information includes effective use duration for which the sponsor service data flow uses the credit quota, the sponsor service data flow information further includes the effective use duration.

With reference to the fourth embodiment and the seventh implementation manner, in a tenth possible implementation manner, when the use information includes a start time, an end time, and effective use duration of using the credit quota by the sponsor service data flow, the sponsor service data flow information includes the start time, the end time, and the effective use duration.

With reference to the fourth embodiment and the seventh implementation manner, in an eleventh possible implementation manner, when the use information includes the sponsor identity, the sponsor service data flow information further includes the sponsor identity.

With reference to the fourth embodiment and the seventh implementation manner, in a twelfth possible implementation manner, according to an event that is included in the reporting message and that indicates that QoS of the sponsor service data flow is changed and changed QoS, whether the change of the QoS of the sponsor service data flow is initiated by the sponsor is determined, and the event and the changed QoS are written into the call detail record when the change of the QoS of the sponsor service data flow is initiated by the sponsor.

With reference to the fourth embodiment and the twelfth implementation manner, in a thirteenth possible implementation manner, the reporting message includes indication information used to indicate that the change of the QoS of the service data flow is initiated by the sponsor, and it is determined according to the indication information that the change of the QoS of the service data flow is initiated by the sponsor.

In conclusion, by means of the embodiments of the present disclosure, a sponsor may sponsor a service data flow of user equipment in an OCS. An online credit control user may use, in an online credit control process, traffic, duration, and a bandwidth that are sponsored by the sponsor. Furthermore, credit control may be performed on the user when the user and the sponsor share costs in order to effectively overcome disadvantages of the other approaches, and improve use efficiency of an OCS.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
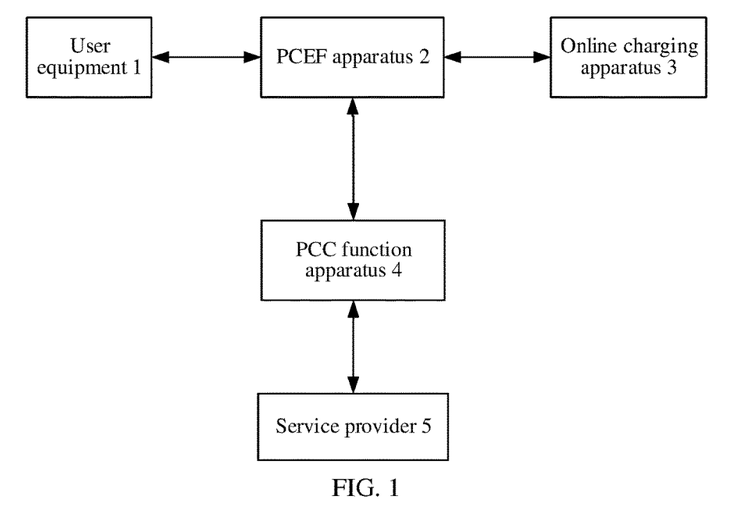
FIG. 1 is a schematic structural diagram of an OCS according to a first embodiment of the present disclosure.

Referring to FIG. 1, FIG. 1 is a schematic structural diagram of an OCS according to a first embodiment of the present disclosure. The OCS includes user equipment 1, a PCEF apparatus 2 (which may be a PCEF), an online charging apparatus 3 (which may be an OCS), a PCC function apparatus 4 (which may be a PCRF), and a service provider 5 (which may be an AF). It should be noted that the service provider 5 may be a sponsor, or the service provider 5 and a sponsor may be two independent individuals. An example in which the service provider 5 is a sponsor is used for description below.

A user may access the service provider 5 (for example, a video website that provides five-minute free videos) using the user equipment 1. After the user clicks a video, the PCC function apparatus 4 learns a service data flow of the five-minute free video sponsored by the service provider 5, generates a PCC rule of the service data flow, and sends the PCC rule to the PCEF apparatus 2. When the service data flow (that is, the service data flow of the video) of the user equipment 1 uses online charging, the PCEF apparatus 2 determines, according to a rating group that is of the service data flow and that is included in the PCC rule, whether the PCEF apparatus 2 has a credit quota available to the service data flow.

If the PCEF apparatus 2 does not have the credit quota available to the service data flow, the PCEF apparatus 2 sends a credit control request including the rating group to the online charging apparatus 3. After receiving the credit control request, the online charging apparatus 3 determines, based on the credit control request, that the service data flow of the user equipment 1 is data access sponsored by the sponsor, and allocates the available credit quota to the service data flow according to a service unit type sponsored by the sponsor when the service data flow is data access sponsored by the sponsor in order to implement sponsoring of the sponsor. When a reporting condition is satisfied, the PCEF apparatus 2 sends a reporting message to the online charging apparatus 3 such that the online charging apparatus 3 may perform online credit control on the user equipment 1 according to the reporting message, and simultaneously generate a call detail record that can be used for settlement of the sponsor to implement that the user equipment 1 may enjoy a five-minute free video provided by the sponsor.

Figure 2:
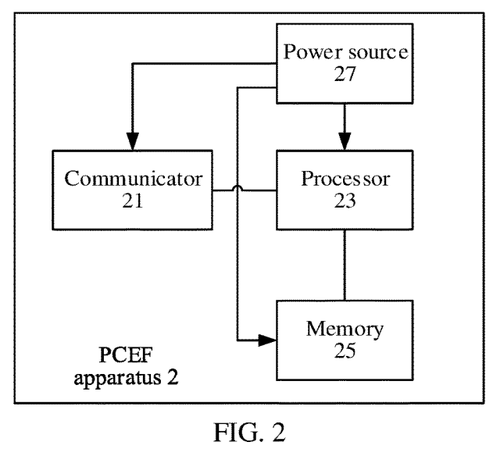
FIG. 2 is a structural diagram of a PCEF apparatus according to a first embodiment of the present disclosure.

Referring to FIG. 2, FIG. 2 is a structural diagram of the PCEF apparatus 2. As can be known from FIG. 2, the PCEF apparatus 2 includes a communicator 21, a processor 23, a memory 25, and a power source 27. The processor 23 is coupled to the communicator 21 and the memory 25. The power source 27 is configured to supply power to the communicator 21, the processor 23, and the memory 25. The memory 25 may store an operating system and another application program. The communicator 21 is used for communication between the PCEF apparatus 2 and another device/apparatus (for example, the user equipment 1, the online charging apparatus 3, and the PCC function apparatus 4) or a communications network.

Figure 3:
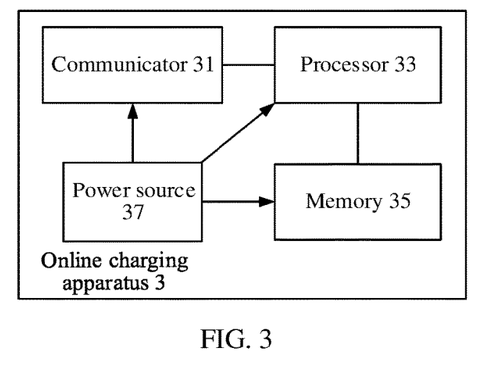
FIG. 3 is a structural diagram of an online charging apparatus according to a first embodiment of the present disclosure.

Referring to FIG. 3, FIG. 3 is a structural diagram of the online charging apparatus 3. As can be known from FIG. 3, the online charging apparatus 3 includes a communicator 31, a processor 33, a memory 35, and a power source 37. The processor 33 is coupled to the communicator 31 and the memory 35. The power source 37 is configured to supply power to the communicator 31, the processor 33, and the memory 35. The memory 35 may store an operating system and another application program. The communicator 31 is used for communication between the online charging apparatus 3 and another device/apparatus (for example, the PCEF apparatus 2) or a communications network. An OCS of this embodiment is described in detail below.

Figure 4A:
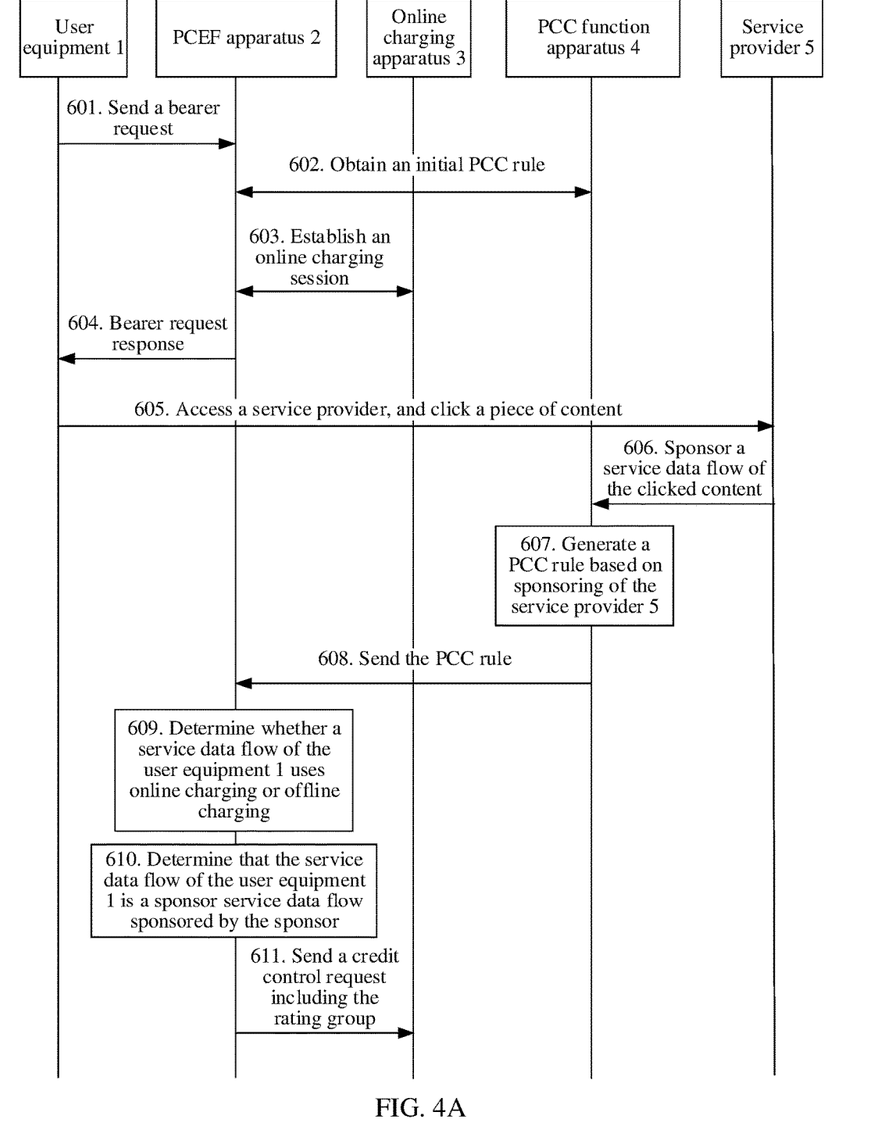
FIG. 4A and FIG. 4B are signaling flowcharts of an OCS according to a first embodiment of the present disclosure.
Figure 4B:
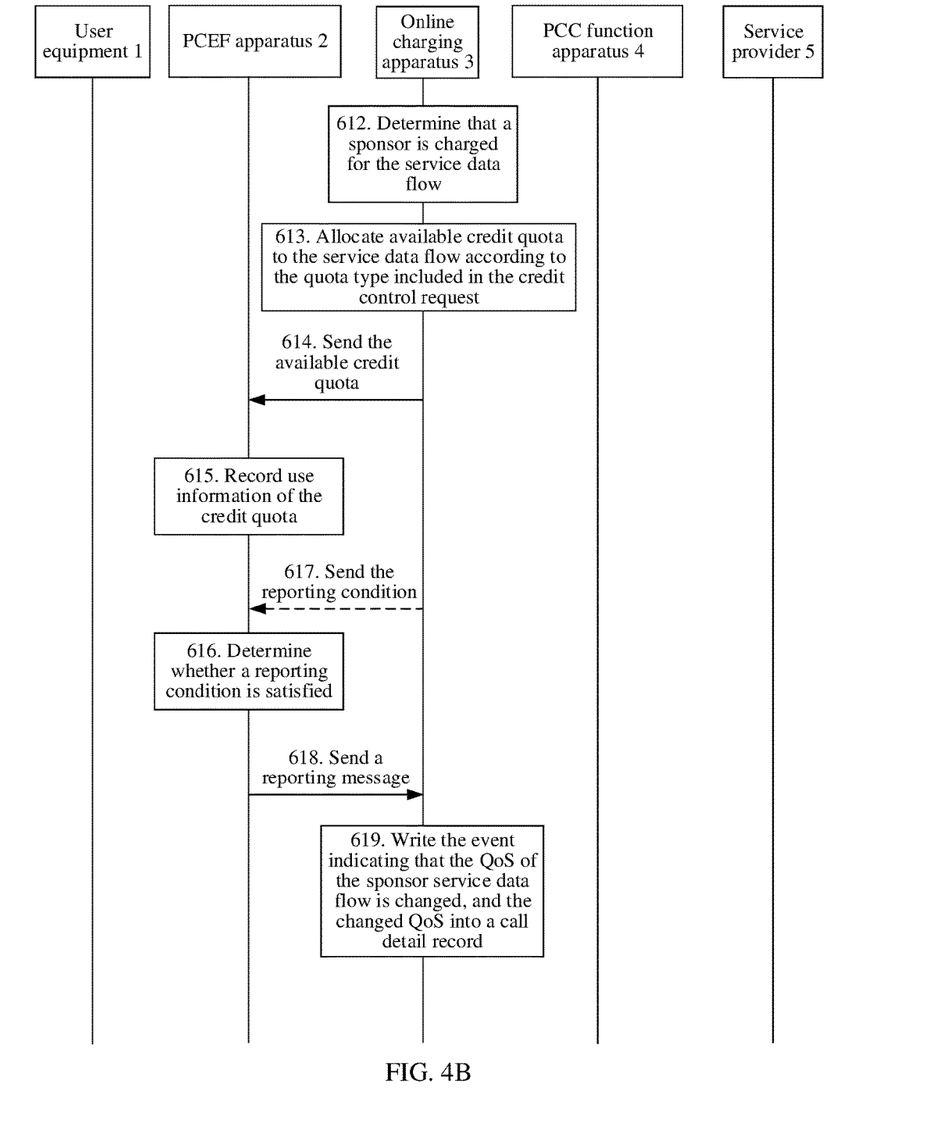

Referring to FIG. 4A and FIG. 4B, FIG. 4A and FIG. 4B are signaling flowcharts of an OCS according to a first embodiment of the present disclosure. FIG. 4A and FIG. 4B may be applied to the OCS in FIG. 1. In step 601, user equipment 1 sends a bearer request to a PCEF apparatus 2 such that the user equipment 1 connects to the OCS in the first embodiment. In step 602, after interaction between the PCEF apparatus 2 and a PCC function apparatus 4, the PCEF apparatus 2 obtains an initial PCC rule from the PCC function apparatus 4. In step 603, the PCEF apparatus 2 may establish an online charging session with an online charging apparatus 3 based on the initial PCC rule. In step 604, the PCEF apparatus 2 sends a bearer request response to the user equipment 1. So far, an online charging mechanism of the user equipment 1 has been established.

In step 605, the user equipment 1 accesses a service provider 5 (for example, a video website that provides five-minute free videos), and clicks a piece of content (for example, a video) of the service provider 5. In step 606, the service provider 5 may sponsor a service data flow of the clicked content. In step 607, the PCC function apparatus 4 generates a PCC rule based on sponsoring of the service provider 5.

Further, the PCC rule generated by the PCC function apparatus 4 may be a new PCC rule (there is no existing corresponding PCC rule), or may be an update on an existing PCC rule (there is a corresponding PCC rule). The PCC rule may include a reporting level, which may be a sponsor level, and a rating group corresponding to the service data flow sponsored by a sponsor. Optionally, the PCC rule may further include a sponsor identity, an application service provider identity, and a quota type sponsored by the sponsor. The quota type may be traffic, duration, traffic and duration, or the like.

In step 608, the PCC function apparatus 4 sends the PCC rule to the PCEF apparatus 2, and the PCEF apparatus 2 receives the PCC rule. In step 609, the PCEF apparatus 2 determines, based on a charging manner included in the PCC rule, whether a service data flow of the user equipment 1 uses online charging or offline charging. Because this embodiment is implemented in an online charging state, only an online charging part is described below.

It should be noted that if the PCC rule does not carry any charging manner, the PCEF apparatus 2 determines, according to a charging manner (pre-defined PCC rule) that is statically configured, whether the service data flow of the user equipment 1 uses online charging or offline charging. According to another aspect, if the PCC rule is obtained by modifying an existing PCC rule, the PCEF apparatus 2 may determine, according to a charging manner of the existing PCC rule, whether the service data flow of the user equipment 1 uses online charging or offline charging.

If the service data flow of the user equipment 1 uses online charging, in step 610, the PCEF apparatus 2 determines, based on the PCC rule, that the service data flow of the user equipment 1 is a sponsor service data flow sponsored by the sponsor. For example, the PCEF apparatus 2 may determine, according to the rating group included in the PCC rule, that the service data flow of the user equipment 1 is sponsored by the sponsor and is a sponsor service data flow, or if the PCC rule includes the sponsor identity, the PCEF apparatus 2 may learn, according to the sponsor identity, that the service data flow of the user equipment 1 is sponsored by the sponsor and is a sponsor service data flow. For the sake of simplicity, the service data flow described below is the sponsor service data flow. It should be noted herein that the sponsor service data flow refers to that the sponsor provides cost support for the service data flow. The service data flow may not be provided by the sponsor.

Because the PCC rule may include the reporting level, which is the sponsor level, the PCEF apparatus 2 determines, based on the rating group that is of the service data flow and that is included in the PCC rule, whether the PCEF apparatus 2 has a credit quota available to the service data flow. The available credit quota herein refers to that the credit quota matches the rating group and the quota type of the sponsor service data flow. The sponsor service data flow may directly use the credit quota. It should be noted that if the PCC rule includes only the rating group of the service data flow, the PCEF apparatus 2 may determine, according to the rating group of the service data flow, whether the PCEF apparatus 2 has the credit quota available to the service data flow.

According to another aspect, if the PCEF apparatus 2 does not have the credit quota available to the service data flow, in step 611, the PCEF apparatus 2 sends a credit control request including the rating group to the online charging apparatus 3 such that after the online charging apparatus 3 receives the credit control request, the online charging apparatus 3 may allocate, based on the rating group, the available credit quota to the PCEF apparatus 2. In another possible implementation manner, if the PCC rule includes the quota type, the PCEF apparatus 2 sends a credit control request including the quota type and the rating group to the online charging apparatus 3 such that after the online charging apparatus 3 receives the credit control request, the online charging apparatus 3 may allocate, based on the quota type and the rating group, the available credit quota to the PCEF apparatus 2. It should be noted that if the PCC rule includes the sponsor identity and a service identity, the credit control request may further include the service identity and the sponsor identity of the service data flow, and a function thereof is described below.

In another possible implementation manner, the PCC rule includes the quota type. When the PCEF apparatus 2 does not have the credit quota available to the sponsor service data flow, the PCEF apparatus 2 further sends, to the online charging apparatus 3, a credit control request that includes the quota type and that specifies the sponsor such that the online charging apparatus 3 determines an allocation manner of the credit quota based on the specified sponsor, and allocates a line of credit corresponding to the quota type to the PCEF apparatus 2. Determining an allocation manner of the credit quota based on the specified sponsor may be not reserving a credit quota for an account of the user equipment 1, but merely allocating a virtual quota, where no actual credit control is performed for the quota. Alternatively, according to the specified sponsor and the rating group, whether account reservation for the user equipment 1 needs to be performed is determined. If yes, reservation is performed according to the account of the user equipment 1, to allocate a corresponding quota. In this case, the user equipment 1 and the sponsor jointly pay for access to the service data flow. The allocated quota further includes a quota needed for charging of the user equipment 1. A type of the allocated quota occupies one account reservation limit.

After the online charging apparatus 3 receives the credit control request, the online charging apparatus 3 is configured to determine, based on the credit control request, whether the service data flow of the user equipment 1 is data access sponsored by the sponsor, and allocate the available credit quota to the service data flow. The online charging apparatus 3 sends the available credit quota to the PCEF apparatus 2.

The online charging apparatus 3 determines, according to the received credit control request, whether the service data flow is data access sponsored by the sponsor. The online charging apparatus 3 may determine, according to the sponsor identity included in the credit control request, that the service data flow is data access sponsored by the sponsor. For example, if data access sponsored by the sponsor is a video, the service data flow may be sponsored by the sponsor only when the service data flow is a video.

In step 612, the online charging apparatus 3 determines that a sponsor is charged for the service data flow. In another possible implementation manner, if the credit control request includes the service identity of the service data flow, the online charging apparatus 3 determines whether the service identity specifies the sponsor. If the service identity specifies the sponsor, the online charging apparatus 3 determines that the service data flow is data access sponsored by the sponsor.

In still another possible implementation manner, if the credit control request includes the rating group of the service data flow, the online charging apparatus 3 determines whether the rating group specifies the sponsor. If the rating group specifies the sponsor, the online charging apparatus 3 determines that the service data flow is data access sponsored by the sponsor.

If the service data flow is data access sponsored by the sponsor, in step 613, the online charging apparatus 3 allocates the available credit quota to the service data flow according to the quota type included in the credit control request. The quota type corresponds to a service unit type sponsored by the sponsor. For example, if the service unit type is duration, the quota type is also duration. If the service unit type is traffic, the quota type is also traffic.

Moreover, the online charging apparatus 3 cannot adjust or change the quota type.

If the quota type is traffic and duration, and the user equipment 1 is charged, when allocating the available credit quota, online charging apparatus 3 allocates duration and traffic of same costs, and locks balance of a same account. For example, five RMB is locked in the balance of the account is locked, and duration that corresponds to five renminbi (RMB) and traffic that corresponds to five RMB are simultaneously allocated.

In another possible implementation manner, if the credit control request does not include the quota type, the online charging apparatus 3 may allocate the available credit quota to the service data flow according to a default quota type stored in the online charging apparatus 3. For example, the default quota type is a "duration and traffic" quota type. The default quota type herein is mainly used to determine a quota type corresponding to a service unit type of a sponsor whose service unit type is not specified.

In still another possible implementation manner, if the credit control request does not include the quota type, the online charging apparatus 3 allocates, according to the service unit type that is stored in the online charging apparatus 3 and that corresponds to the sponsor, the available credit quota corresponding to the service unit type to the service data flow. A premise is that the service unit type sponsored by the sponsor is preconfigured in a charging system.

In another possible implementation manner, if the online charging apparatus 3 determines, according to the rating group, that the user equipment 1 needs to be charged, the quota type is a combination of the service unit type of the sponsor and a charging unit type of the user equipment 1, and an available credit quota corresponding to the quota type of the combination is allocated to the service data flow. For example, if the service unit type of the sponsor is traffic, and the charging unit type of the user equipment 1 is duration, the quota type is a combination of traffic and duration.

After the available credit quota is allocated, in step 614, the online charging apparatus 3 sends the available credit quota to the PCEF apparatus 2. After the PCEF apparatus 2 receives the available credit quota, in step 615, the PCEF apparatus 2 records use information of the credit quota. It should be noted that the recorded use information corresponds to one of the sponsor identity, the rating group, the application service provider identity, or a combination thereof.

According to another aspect, if the available credit quota includes duration, the PCEF apparatus 2 records a start time, an end time, and an effective use duration of using the credit quota by the service data flow in a current reporting period. The use information includes the start time, the end time, and the effective use duration of using the credit quota by the service data flow in the current reporting period. For example, the current reporting period is from a time at which the PCEF apparatus 2 receives the available credit quota to a time at which the PCEF apparatus 2 sends a reporting message. Assuming that the time at which the PCEF apparatus 2 receives the available credit quota is 4:10 p.m., and the time at which the PCEF apparatus 2 sends the reporting message is 4:30 p.m., the reporting period is from 4:10 p.m. to 4:30 p.m., which is totally 20 minutes. In the 20-minute interval, if there is a service data flow that starts using the credit quota at 4:12 p.m. and that ends using the credit quota at 4:22 p.m., the start time and the end time at which the service data flow uses the credit quota are respectively 4:12 p.m. and 4:22 p.m. In addition, the service data flow may be an intermittent data flow. For example, from 4:12 p.m. to 4:14 p.m. and from 4:17 p.m. to 4:22 p.m., the effective use duration for which the service data flow uses the credit quota is 2 minutes plus 5 minutes, which is totally 7 minutes.

In step 616, the PCEF apparatus 2 determines whether a reporting condition is satisfied. If the reporting condition is satisfied, in step 618, the PCEF apparatus 2 sends the reporting message to the online charging apparatus 3 such that the online charging apparatus 3 performs charging process based on the reporting message, where the reporting message may include the rating group, the sponsor identity, the application service provider identity, and the use information. The use information herein is use information corresponding to the sponsor identity and the application service provider identity.

Further, the reporting condition may be a local reporting condition (that is, a reporting condition stored in the PCEF apparatus 2), or the reporting condition may be sent to the PCEF apparatus 2 in step 615 together with the available credit quota, or as shown in step 617, the reporting condition may be sent by the online charging apparatus 3 to the PCEF apparatus 2. Specific content of the reporting condition may be whether the credit quota runs out, whether a time limit of the credit quota expires, and whether QoS of the service data flow is changed, and the like.

For example, the PCEF apparatus 2 may receive the reporting condition from the online charging apparatus 3. The reporting condition sent by the online charging apparatus 3 to the PCEF apparatus 2 is classified into two types: (1) The reporting condition corresponds to the sponsor, and (2) the reporting condition corresponds to the user equipment 1. For example, the reporting condition of the sponsor may be that the QoS is changed. The reporting condition of the user equipment 1 may be that a user location is changed. The PCEF apparatus 2 needs to send the reporting message to the online charging apparatus 3 when either of the reporting condition of the sponsor or the reporting condition of the user equipment 1 is satisfied.

Moreover, if the reporting condition is that the QoS of the service data flow is changed, when the QoS of the service data flow is changed, the PCEF apparatus 2 sends the reporting message to the online charging apparatus 3 such that the online charging apparatus 3 determines, based on the reporting message, whether the change of the QoS is initiated by the sponsor, and performs corresponding charging. The reporting message includes an event indicating that the QoS of the sponsor service data flow is changed, and changed QoS. How to determine whether the change of the QoS is initiated by the sponsor may be learned in the following several manners.

If the reporting message includes indication information used to indicate that an initiator of the change of the QoS is the sponsor, the online charging apparatus 3 may determine, according to the indication information, that the change of the QoS is initiated by the sponsor.

If the reporting message includes a particular rating group used to indicate that the change of the QoS of the service data flow is initiated by the sponsor, the online charging apparatus 3 may determine, according to the particular rating group, that the change of the QoS of the service data flow is initiated by the sponsor.

In step 619, if the change of the QoS is initiated by the sponsor, the online charging apparatus 3 writes the event indicating that the QoS of the sponsor service data flow is changed, and the changed QoS into a call detail record. The change of the QoS is not used as a charging factor for the user equipment 1. If the change of the QoS is not initiated by the sponsor, the online charging apparatus 3 uses the changed QoS as a charging factor for the user equipment 1, and the changed QoS is not used to generate the call detail record of the sponsor. The charging factor herein refers to a condition on which whether to charge a user is determined and a charging rate is determined.

Moreover, the reporting message includes one of the rating group, the sponsor identity, the application service provider identity, or the use information of the available credit quota corresponding to the sponsor identity and the application service provider identity, or a combination thereof. Therefore, the online charging apparatus 3 generates a call detail record based on the sponsor identity and the application service provider identity. The call detail record includes the sponsor identity, the application service provider identity, and the use information of the available credit quota corresponding to the sponsor identity and the application service provider identity. For example, the online charging apparatus 3 determines that charging process needs to be performed on the user equipment 1, and the online charging apparatus 3 performs charging process on the user equipment 1 based on the rating group and the use information.

If the reporting message includes the use information of use of the credit quota by the service data flow, the online charging apparatus 3 generates sponsor service data flow information according to the use information, and writes the sponsor service data flow information into the call detail record.

The use information includes the start time, the end time, and the effective use duration of using the credit quota by the service data flow in the current reporting period. The sponsor service data flow information also needs to include the start time, the end time, and the effective use duration of using the credit quota by the service data flow in the current reporting period.

Alternatively, if the use information does not include the start time or the end time of using the credit quota by the service data flow in the current reporting period, the online charging apparatus 3 considers a local time at which the online charging apparatus 3 sends the credit quota as the start time of the sponsor service data flow and considers a local time at which the online charging apparatus 3 receives the reporting message as the end time of the sponsor service data flow. In this way, the sponsor service data flow information may still include the start time and the end time of using the credit quota by the service data flow in the current reporting period. If the use information includes the effective use duration of using the credit quota by the service data flow in the current reporting period, the sponsor service data flow information also includes the effective use duration of using the credit quota by the service data flow in the current reporting period.

If the use information includes the sponsor identity, the sponsor service data flow information further includes the sponsor identity.

Figure 5:
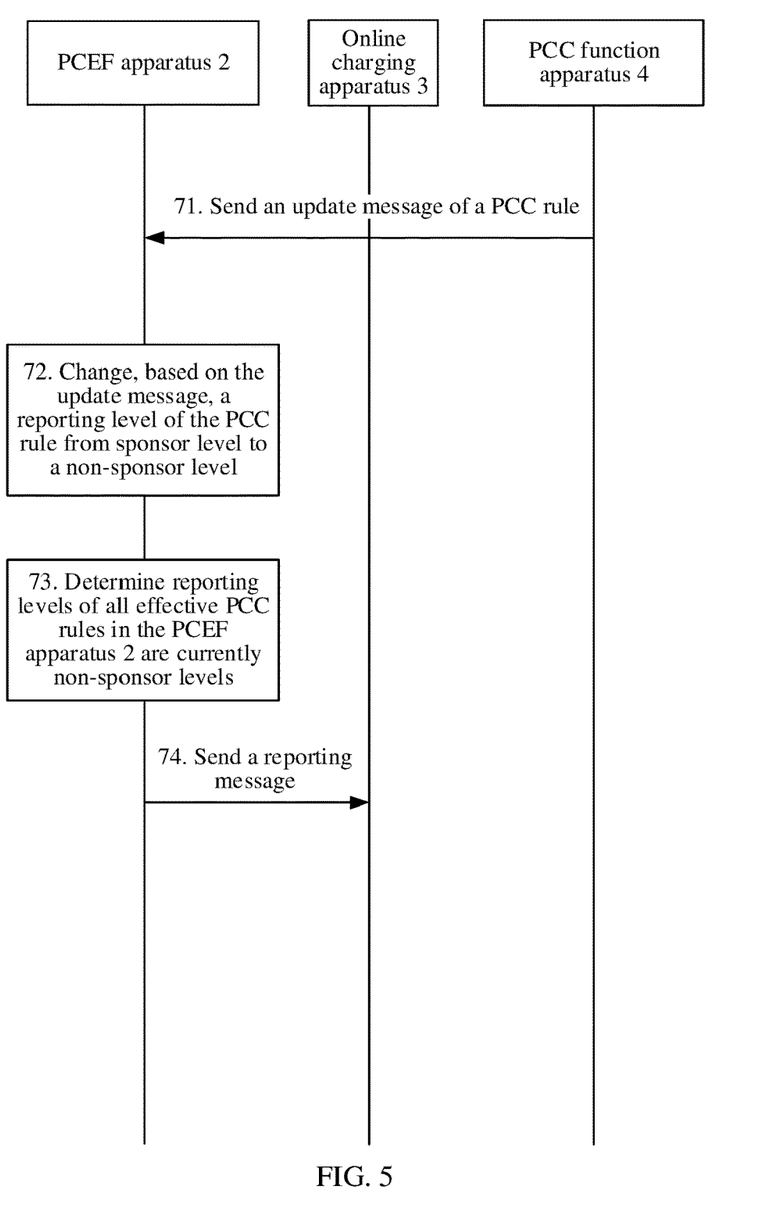
FIG. 5 is a signaling flowchart of an OCS according to a first embodiment of the present disclosure.

Another implementation scenario of this embodiment is described below. Referring to FIG. 5, FIG. 5 is a signaling flowchart of an OCS according to an embodiment. FIG. 5 may be applied to the OCS in FIG. 1. If a PCC function apparatus 4 determines that collection and reporting of charging information of a sponsor level need to be stopped, the PCC function apparatus 4 generates an update message of a reporting PCC rule of the sponsor level. In step 71, the PCC function apparatus 4 sends an update message of a PCC rule to a PCEF apparatus 2. In step 72, the PCEF apparatus 2 receives the update message of the PCC rule, and the PCEF apparatus 2 changes, based on the update message, a reporting level of the PCC rule from a sponsor level to a non-sponsor level.

In step 73, the PCEF apparatus 2 determines reporting levels of all effective PCC rules in the PCEF apparatus 2 are currently non-sponsor levels. In step 74, the PCEF apparatus 2 sends a reporting message to an online charging apparatus 3 such that the online charging apparatus 3 performs charging based on the reporting message and ends charging process on a service data flow. For details about how to perform charging according to the reporting message, refer to the foregoing content, and details are not described herein.

In conclusion, by means of the embodiments of the present disclosure, a sponsor may sponsor a service data flow of user equipment in an OCS. An online credit control user may use, in an online credit control process, traffic, duration, and a bandwidth that are sponsored by the sponsor. Furthermore, credit control may be performed on the user when the user and the sponsor share costs in order to effectively overcome disadvantages of the other approaches, and improve use efficiency of an OCS.

Figure 6:
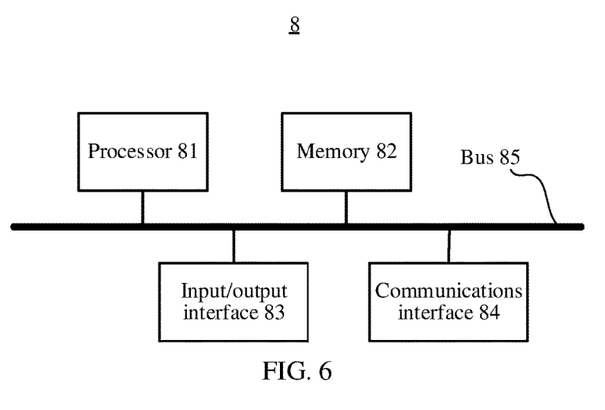
FIG. 6 is a schematic structural diagram of hardware of an online charging apparatus according to an embodiment of the present disclosure.

FIG. 6 is a schematic structural diagram of hardware of an online charging apparatus 8 according to an embodiment of the present disclosure. As shown in FIG. 6, the online charging apparatus 8 includes a processor 81, a memory 82, an input/output interface 83, a communications interface 84, and a bus 85. The processor 81, the memory 82, the input/output interface 83, and the communications interface 84 communicate with and connect to each other using the bus 85.

The processor 81 may use a general-purpose central processing unit (CPU), a microprocessor, an application specific integrated circuit (ASIC), or one or more integrated circuits, and is configured to execute a related program in order to implement the technical solutions provided in this embodiment of the present disclosure.

The memory 82 may be a read-only memory (ROM), a static storage device, a dynamic storage device, or a random access memory (RAM). The memory 82 may store an operating system and another application program. When the technical solutions provided in this embodiment of the present disclosure are implemented using software or firmware, program code for implementing the technical solutions provided in this embodiment of the present disclosure is stored in the memory 82, and is executed by the processor 81.

The input/output interface 83 is configured to receive data and information that are input, and output data such as an operation result.

The communications interface 84 implements communication between the online charging apparatus 8 and another device or a communications network using, for example, but not limited to, a transceiver apparatus such as a transceiver or a transceiver module.

The bus 85 may include a path, and transmits information between components of the online charging apparatus 8 (for example, the processor 81, the memory 82, the input/output interface 83, and the communications interface 84).

It should be noted that although the online charging apparatus 8 shown in FIG. 6 merely shows the processor 81, the memory 82, the input/output interface 83, the communications interface 84, and the bus 85, in a specific implementation process, a person skilled in the art should understand that the online charging apparatus 8 further includes another necessary component for normal running. In addition, a person skilled in the art should understand that the online charging apparatus 8 may further include, according to a specific need, a hardware component for implementing another additional function. In addition, a person skilled in the art should understand that the online charging apparatus 8 may include merely a necessary component or module for implementing this embodiment of the present disclosure, but does not necessarily include all components shown in FIG. 6.

The hardware structure shown in FIG. 6 and the foregoing description are applicable to the PCEF apparatus 2 provided in the embodiments of the present disclosure.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a ROM, or a RAM.

Specific examples are used in this specification to describe the principle and implementation manners of the present disclosure. The descriptions of the foregoing embodiments are merely intended to help understand the method and idea of the present disclosure. In addition, with respect to the implementation manners and the application scope, modifications may be made by a person of ordinary skill in the art according to the idea of the present disclosure. Therefore, this specification shall not be construed as a limitation on the present disclosure.

What is claimed is:

1. A policy and charging enforcement function (PCEF) apparatus, comprising:
    a communications interface configured to receive a policy and charging control (PCC) rule from a Policy and Charging Rules Function (PCRF); and
    a processor coupled to the communications interface and configured to:
        determine, based on the PCC rule, that a service data flow of a user equipment comprises a sponsor service data flow sponsored by a sponsor; and
        determine, based on a rating group of the sponsor service data flow comprised in the PCC rule, whether the PCEF apparatus has a credit quota available to the sponsor service data flow when the sponsor service data flow uses online charging,
    the communications interface being further configured to:
        send a credit control request comprising the rating group to an online charging apparatus when the PCEF apparatus does not have the credit quota available to the sponsor service data flow; and
        receive the credit quota available to the sponsor service data flow from the online charging apparatus, and
    the processor being further configured to record use information of use of the credit quota by the sponsor service data flow.

2. The PCEF apparatus of claim 1, wherein the processor is further configured to determine, based on the rating group, that the service data flow of the user equipment comprises the sponsor service data flow sponsored by the sponsor.

3. The PCEF apparatus of claim 2, wherein the use information recorded by the processor corresponds to the rating group, and the communications interface being further configured to send a reporting message comprising the rating group and the use information to the online charging apparatus when a reporting condition is satisfied.

4. The PCEF apparatus of claim 3, wherein the communications interface is further configured to:
    receive the reporting condition from the online charging apparatus, the reporting condition comprising that a quality of service (QoS) of the service data flow is changed; and
    send the reporting message to the online charging apparatus when the QoS of the service data flow is changed.

5. The PCEF apparatus of claim 1, wherein the PCC rule further comprises a sponsor identity, and the processor being further configured to determine, based on the sponsor identity, that the service data flow of the user equipment comprises the sponsor service data flow sponsored by the sponsor.

6. The PCEF apparatus of claim 5, wherein the PCC rule further comprises the sponsor identity and an application service provider identity, the use information recorded by the processor corresponding to the sponsor identity and the application service provider identity, and the communications interface being further configured to send a reporting message comprising the sponsor identity, the application service provider identity, and the use information to the online charging apparatus when a reporting condition is satisfied.

7. The PCEF apparatus of claim 1, wherein the credit quota available to the sponsor service data flow comprises duration, and the processor being further configured to record a start time, an end time, and effective use duration of using the credit quota by the sponsor service data flow in a current reporting period.

8. A charging method applied to a policy and charging enforcement function (PCEF) apparatus, comprising:
    receiving a policy and charging control (PCC) rule from a Policy and Charging Rules Function (PCRF);
    determining, based on the PCC rule, that a service data flow of a user equipment comprises a sponsor service data flow sponsored by a sponsor,
    determining, based on a rating group of the sponsor service data flow comprised in the PCC rule, whether the PCEF apparatus has a credit quota available to the sponsor service data flow when the sponsor service data flow uses online charging;
    sending a credit control request comprising the rating group to an online charging apparatus when the PCEF apparatus does not have the credit quota available to the sponsor service data flow;
    receiving the credit quota available to the sponsor service data flow from the online charging apparatus; and
    recording use information of use of the credit quota by the sponsor service data flow.

9. The charging method of claim 8, further comprising determining, based on the rating group, that the service data flow of the user equipment comprises the sponsor service data flow sponsored by the sponsor.

10. The charging method of claim 9, wherein the use information corresponds to the rating group, and the charging method further comprising sending a reporting message comprising the rating group and the use information to the online charging apparatus when a reporting condition is satisfied.

11. The charging method of claim 10, further comprising:
    receiving the reporting condition from the online charging apparatus, the reporting condition comprising that a quality of service (QoS) of the service data flow is changed; and
    sending the reporting message to the online charging apparatus when the QoS of the service data flow is changed.

12. The charging method of claim 8, wherein the PCC rule further comprises a sponsor identity, and the charging method further comprising determining, based on the sponsor identity, that the service data flow of the user equipment comprises the sponsor service data flow sponsored by the sponsor.

13. The charging method of claim 12, wherein the PCC rule further comprises the sponsor identity and an application service provider identity, the use information corresponding to the sponsor identity and the application service provider identity, and the charging method further comprising sending a reporting message comprising the sponsor identity, the application service provider identity, and the use information to the online charging apparatus when a reporting condition is satisfied.

14. The charging method of claim 8, wherein the credit quota available to the sponsor service data flow comprises duration, and the charging method further comprising recording a start time, an end time, and effective use duration of using the credit quota by the sponsor service data flow in a current reporting period.

15. A charging method applied to an online charging apparatus, comprising:
   receiving a credit control request from a policy and charging enforcement function (PCEF) apparatus, the credit control request comprising a rating group;
   determining, based on the rating group comprised in the credit control request, that a service data flow of a user equipment comprises a sponsor service data flow sponsored by a sponsor when the rating group specifies the sponsor;
   allocating a credit quota to the sponsor service data flow according to the rating group; and
   sending the credit quota to the PCEF apparatus.

16. The charging method of claim 15, wherein allocating the credit quota to the sponsor service data flow comprises allocating the credit quota to the sponsor service data flow according to a default quota type stored in the online charging apparatus.

17. The charging method of claim 15, wherein the credit control request comprises a quota type, and allocating the credit quota to the sponsor service data flow comprises allocating, according to the quota type comprised in the credit control request.

18. The charging method of claim 15, wherein the method further comprises:
   determining a reporting condition corresponding to the sponsor; and
   sending the reporting condition to the PCEF apparatus.

* * * * *

UNITED STATES PATENT AND TRADEMARK OFFICE
CERTIFICATE OF CORRECTION

PATENT NO. : 10,320,991 B2
APPLICATION NO. : 15/809645
DATED : June 11, 2019
INVENTOR(S) : Xiaoqian Chai

Page 1 of 1

It is certified that error appears in the above-identified patent and that said Letters Patent is hereby corrected as shown below:

In the Specification

Column 2, Line 11, should read:
OCS, where the quota type and number are determined by the Signed and Sealed this
Twentieth Day of August, 2019

Andrei Iancu
*Director of the United States Patent and Trademark Office*